(12) United States Patent
Taylor et al.

(10) Patent No.: US 10,022,650 B2
(45) Date of Patent: Jul. 17, 2018

(54) SYSTEMS AND METHODS FOR ENHANCED SEPARATION OF HYDROGEN SULFIDE AND AMMONIA IN A HYDROGEN SULFIDE STRIPPER

(71) Applicant: Bechtel Hydrocarbon Technology Solutions, Inc., Houston, TX (US)

(72) Inventors: Martin Taylor, Houston, TX (US); Charles Kimtantas, Sugar Land, TX (US)

(73) Assignee: Bechtel Hydrocarbon Technology Solutions, Inc., Houston, TX (US)

( * ) Notice: Subject to any disclaimer, the term of this patent is extended or adjusted under 35 U.S.C. 154(b) by 0 days.

(21) Appl. No.: 15/123,546

(22) PCT Filed: Mar. 5, 2015

(86) PCT No.: PCT/US2015/019009
§ 371 (c)(1),
(2) Date: Sep. 2, 2016

(87) PCT Pub. No.: WO2015/134774
PCT Pub. Date: Sep. 11, 2015

(65) Prior Publication Data
US 2017/0072338 A1    Mar. 16, 2017

Related U.S. Application Data

(60) Provisional application No. 61/948,118, filed on Mar. 5, 2014.

(51) Int. Cl.
| | | |
|---|---|---|
| C01C 1/12 | (2006.01) | |
| C01C 1/02 | (2006.01) | |
| C01C 1/10 | (2006.01) | |
| B01D 53/14 | (2006.01) | |
| B01D 53/73 | (2006.01) | |
| B01D 53/96 | (2006.01) | |
| C02F 1/20 | (2006.01) | |
| B01D 19/00 | (2006.01) | |
| C02F 103/36 | (2006.01) | |

(52) U.S. Cl.
CPC ..... *B01D 19/0015* (2013.01); *B01D 53/1425* (2013.01); *C01C 1/12* (2013.01); *C02F 1/20* (2013.01); *C02F 2103/365* (2013.01)

(58) Field of Classification Search
None
See application file for complete search history.

(56) References Cited

U.S. PATENT DOCUMENTS 3,754,376 A    8/1973 Kent
3,984,316 A    10/1976 Worrall et al.
(Continued)

FOREIGN PATENT DOCUMENTS

JP    2010221106 A    6/2015

OTHER PUBLICATIONS

Lee W. Young, The International Search Report and the Written Opinion, International Application No. PCT/US15/19009, dated May 21, 2015, 9 pages, International Searching Authority, Alexandria, Virginia.
(Continued)

*Primary Examiner* — Daniel Berns
(74) *Attorney, Agent, or Firm* — Crain Caton and James

(57) ABSTRACT

Systems and methods for enhanced separation of H2S and NH3 in an H2S stripper using carbon dioxide and/or an inert gas.

6 Claims, 3 Drawing Sheets

(56) References Cited

U.S. PATENT DOCUMENTS

| | | | |
|---|---|---|---|
| 4,242,108 | A | 12/1980 | Nicholas et al. |
| 4,414,103 | A | 11/1983 | Farrell |
| 4,469,668 | A | 9/1984 | Spevack |
| 5,236,557 | A | 8/1993 | Muller et al. |
| 5,368,754 | A | 11/1994 | Von Clock et al. |
| 2011/0272365 | A1 | 11/2011 | Defosse et al. |
| 2012/0039792 | A1 | 2/2012 | Duta |
| 2013/0001135 | A1 | 1/2013 | Bares et al. |
| 2013/0243677 | A1 | 9/2013 | Siskin et al. |

OTHER PUBLICATIONS

Stanley Silverman, International Preliminary Report on Patentability, PCT Application No. PCT/US15/19009, dated May 19, 2016, 18 pages, International Preliminary Examining Authority, Alexandria, Virginia.

Melissa Wyllie, Examination Report No. 1 for Standard Patent Application, Australian Patent Application No. 2015227041, dated Apr. 28, 2017, 5 pages, Australian Government IP Australia, Australia.

Lacy, J., Physical Treatment of Oil Refinery Wastewater, Apr. 5 and 6, 1977, 152 pages, Symposium on Physical-Mechanical Treatment of Wastewaters, United Sates Environmental Protection Agency, Cincinnati, Ohio.

James McCarthy, Examination Report, Canadian Patent Application No. 2,941,410, dated May 24, 2017, 4 pages, Canadian Intellectual Property Office, Canada.

Matthew Lay, Request to Amend a Complete Specification, Australian Patent Application No. 2015227041, dated Aug. 21, 2017, 19 pages, FB Rice Pty Ltd., Melbourne Australia.

Japan Patent Office, Office Action, Patent Application No. 2016-573689, dated Jul. 27, 2017, 3 pages, Japan Patent Office, Japan.

Nakamura & Partners, Response to Office Action, Patent Application No. 2016-573689, dated Sep. 19, 2017, 3 pages, Tokyo, Japan.

Van Ganswijk, J., Extended European Search Report, Application No. 15758346.9, dated Aug. 31, 2017, 11 pages, European Patent Office, Munich, Germany.

Kimberley Lachaine, Response to Exam Report, Canadian Patent Application No. 2941410, dated Nov. 21, 2017, 13 pages, Klrby IP Canada, Canada.

Melissa Wyllie, Examination Report No. 2 for Standard Patent Application, Australian Patent Application No. 2015227041, dated Oct. 13, 2017, 8 pages, Australian Government IP, Australia.

Matthew Lay, Second Statement of Proposed Amendments, Australian Patent Application No. 2015227041, dated Dec. 20, 2017, 17 pages, FB Rice Pty Ltd, Australia.

James McCarthy, Examination Report, Canadian Patent Application No. 2941410, dated Jan. 18, 2018, 3 pages, Canadian Intellectual Property Office, Ottawa Ontario.

Japan Patent Office, 2nd Office Action, Japanese Patent Application No. 2016-573689, dated Jan. 22, 2018, 2 pages, Japan Patent Office, Japan.

SYSTEMS AND METHODS FOR ENHANCED SEPARATION OF HYDROGEN SULFIDE AND AMMONIA IN A HYDROGEN SULFIDE STRIPPER

CROSS-REFERENCE TO RELATED APPLICATIONS

This Application claims priority from PCT Patent Application Serial No. PCT/US15/19009, filed on Mar. 5, 2015, which claims priority from U.S. Provisional Patent Application Ser. No. 61/948,118, filed on Mar. 5, 2014, which are incorporated herein by reference.

STATEMENT REGARDING FEDERALLY SPONSORED RESEARCH

Not applicable.

FIELD OF THE INVENTION

The present invention generally relates to systems and methods for enhanced separation of hydrogen sulfide (H2S) and ammonia (NH3) in an H2S stripper. More particularly, the present invention relates to enhanced separation of H2S and NH3 in an H2S stripper using carbon dioxide and/or an inert gas.

BACKGROUND OF THE INVENTION

Conventional technology separately recovers H2S and NH3 from sour water using an H2S stripper and an NH3 stripper, which is sometimes referred to as a two-column sour water stripping process. This process yields acid gas (H2S) with less than 50 ppmw NH3 and a high purity gaseous or liquid NH3 product. The separated water is of excellent quality, making it suitable for reuse as coke drum quench water, crude unit desalter water, and hydro-processing unit injection water or it may be sent to effluent treating for discharge.

A two-column sour water stripping process typically includes four main processing stages: 1) degassing and feed preparation; 2) H2S stripping; 3) NH3 stripping; and 4) NH3 purification and liquefaction. Referring now to FIGS. 1A and 1B, a schematic diagram of a conventional two-column sour water stripping system 100 illustrates the four processing stages. The following pressures and temperatures are exemplary and only for purposes of illustration.

Degassing and Feed Preparation:

Sour water feeds 102 from a single or several sources are combined with a recycle stream 104 from the NH3 stripper 106, which are cooled and passed through a degasser 108 where dissolved hydrogen (H2), methane (CH4) and other light hydrocarbons are removed as a hydrocarbon vapor stream 105. The sour water feeds 102 include dissolved NH3 and H2S. The recycle stream 104 includes rich NH3, which helps keep acid gases in solution in the degasser 108, thereby minimizing the release of acid gas and possible air pollution. The degassed sour water stream 109 is sent to a deoiler 103, which removes free oil from the degassed sour water stream 109 to produce a degassed/deoiled sour water stream 107. The degassed/deoiled sour water stream 107 is pumped to a feed preparation tank 110, which serves to attenuate flow rate and composition changes while also providing the opportunity to remove entrained oil and solids. The feed preparation tank 110 produces a processed sour water stream 111, which is pumped to a feed coalescer unit 112 that filters solids remaining in the processed sour water stream 111 and further separates entrained oil to produce a hydrocarbon liquid 113 and a deoiled sour water stream 115. The deoiled sour water stream 115 is sent to a feed/product exchanger 114, which acts as a heat exchanger to heat the deoiled sour water stream 115 and cool the NH3 stripper bottoms stream 132 to produce a heated deoiled sour water stream 116 and the stripped water stream 134. In this manner, the components comprising the NH3 stripper bottoms stream 132, stripped water stream 134 and the components comprising the deoiled sour water stream 115, heated deoiled sour water stream 116 are, respectively, the same but may have different concentrations and temperatures. The heated deoiled sour water stream 116 is then sent to an H2S stripper 118.

H2S Stripping:

The H2S stripper 118 contains trays or packing (not shown) that the heated deoiled sour water stream 116 flows through and around to separate H2S from the heated deoiled sour water stream 116. A cooled reflux water stream (e.g. water wash) 136 is used remove heat and suppress evolution of gaseous NH3 in the H2S stripper. A reboiler 137 acts as a heat exchanger to provide the energy required to i) heat the heated deoiled sour water stream 116 and the cooled reflux water stream 136 to a preferred temperature; and ii) strip out H2S from the heated deoiled sour water stream 116. The resulting H2S stripper overheads stream 120 is sent to a knock out drum 138 to substantially remove any entrained droplets and produce H2S stream 126. The H2S stream 126 is of high purity and is an excellent feed for a sulfur recovery unit (SRU) or a sulfuric acid plant. It contains a negligible amount of NH3 (less than 50 ppmw) and very little hydrocarbons since the sour water feeds 102 have been degassed. The H2S stream 126 is available at about 100-180 psig and 100-120° F. The resulting H2S stripper bottoms stream 130, which contains NH3 and some H2S, is sent directly to the NH3 stripper 106.

NH3 Stripping:

The NH3 stripper 106 is a steam re-boiled, refluxed distillation column. In the NH3 stripper 106, essentially all NH3 and any remaining H2S are removed from the H2S stripper bottoms stream 130, which leaves the NH3 stripper 106 as an NH3 stripper bottoms stream 132. The NW stripper bottoms stream 132 is sent to the feed/product exchanger 114 where heat is exchanged with the deoiled sour water stream 115 and the NH3 stripper bottoms stream 132 is cooled to form the stripped water stream 134. The stripped water stream 134 is suitable for many plant reuse needs or may be discharged. The containment levels of H2S and NH3 in the stripped water stream 134 may be tailored to individual requirements and is typically 10-50 ppmw NH3 and 1-25 ppmw H2S. The stripped water stream 134 is available at about 100-200° F. In the NH3 stripper 106, essentially all NH3 and any remaining H2S are removed from the H2S stripper bottoms stream 130, which leaves the NH3 stripper 106 as an NH3 stripper overheads stream 133. The NH3 stripper overheads stream 133 is sent to an overhead condenser where it is converted to an NH3 vapor stream and an NH3 liquid stream. A knock out drum 139 separates the NH3 vapor stream 140 and the NH3 liquid stream 150. A portion of the NH3 liquid stream 150 is returned as reflux to the NH3 stripper 106 and another portion of the NH3 liquid stream 150 forms the recycle stream 104. A reboiler 141 acts as a heat exchanger to provide the energy required to remove NH3 and any remaining H2S. The NH3 vapor stream 140 is an NH3-rich gas, which may be processed in a variety of ways.

NH3 Purification and Liquefaction:

Referring now to FIG. 1B, the NH3 vapor stream 140 is sent to a water wash 142 to remove residual amounts of H2S and some hydrocarbons. This step is also referred to as water scrubbing, which produces a scrubbed NH3 vapor stream 160. If NH3 recovery is not desired or economic, the scrubbed NH3 vapor stream 160 may be incinerated. In most cases, however, it is desirable to further purify the scrubbed NH3 vapor stream 160 to produce either anhydrous liquid NH3 170 or aqueous NH3 180 suitable for commercial use. In order to further purify the scrubbed NH3 vapor stream 160, the scrubbed NH3 vapor stream 160 is sent to a caustic wash 144 to remove residual contaminants including some hydrocarbons. This step is also referred to as caustic scrubbing, which produces a double scrubbed NH3 vapor stream 162 and may be necessary when problems are expected with process upsets, carbon dioxide, or complex sulfur compounds (e.g. mercaptans or disulfides). The double scrubbed NH3 vapor stream 162 may be sent to either a compressor 146 or a refrigeration unit 148 to produce the anhydrous liquid NH3 170, which contains a negligible amount of H2S (less than 5 ppmw). The anhydrous liquid NH3 170 is available at about 200 psig and 100° F. if liquefied by compression and at atmospheric pressure and about −26 F if liquefied by cooling. Cooling water and/or a refrigerant may be used to exchange heat with the compressed double scrubbed NH3 vapor stream 162. The double scrubbed NH3 vapor stream 162 may also be sent to an NH3 absorber 149, which is essentially another water wash, to produce the aqueous NH3 180, which contains a negligible amount of sulfur (no more than about 2 ppmw). The aqueous NH3 180 is available at about 35 psig and 100° F.

SUMMARY OF THE INVENTION

The present invention overcomes one or more of the prior art disadvantages by providing systems and methods for enhanced separation of H2S and NH3 in an H2S stripper using carbon dioxide and/or an inert gas.

In one embodiment, the present invention includes a system for separating hydrogen sulfide and ammonia, which comprises: i) a hydrogen sulfide stripper for separating the hydrogen sulfide and the ammonia; and ii) a stripping gas stream connected to the hydrogen sulfide stripper, wherein the stripping gas stream comprises at least one of a carbon dioxide and an inert gas.

In another embodiment, the present invention includes a method for separating hydrogen sulfide and ammonia, which comprises: i) introducing a fluid mixture of the hydrogen sulfide and the ammonia into a hydrogen sulfide stripper; ii) introducing a stripping gas into the hydrogen sulfide stripper, wherein the stripping gas comprises only carbon dioxide and an inert gas selected from the group consisting of Helium, Neon, Argon, Krypton, Xenon and Radon; and iii) separating most of the hydrogen sulfide and the ammonia in the fluid mixture using the stripping gas in the hydrogen sulfide stripper, which forms a hydrogen sulfide stripper overheads stream and a hydrogen sulfide stripper bottoms stream.

Additional aspects, advantages and embodiments of the invention will become apparent to those skilled in the art from the following description of the various embodiments and related drawings.

BRIEF DESCRIPTION OF THE DRAWINGS

The present invention is described below with references to the accompanying drawings in which like elements are referenced with like numerals and in which.

DETAILED DESCRIPTION OF THE PREFERRED EMBODIMENTS

The subject matter of the present invention is described with specificity, however, the description itself is not intended to limit the scope of the invention. The subject matter thus, might also be embodied in other ways, to include different steps or combinations of steps similar to the ones described herein, in conjunction with other technologies. Moreover, although the term "step" may be used herein to describe different elements of methods employed, the term should not be interpreted as implying any particular order among or between various steps herein disclosed unless otherwise expressly limited by the description to a particular order. While the following description refers to the oil and gas industry, the systems and methods of the present invention are not limited thereto and may also be applied in other industries to achieve similar results.

The present invention provides systems and methods to enhance the separation of H2S and NH3 in an H2S stripper using carbon dioxide and/or an inert gas. The purpose of the carbon dioxide and/or an inert gas, also referred to as a stripping gas, is to enhance the separation of H2S and NH3 during the H2S stripping stage by i) lowering the partial pressure of H2S; and ii) providing a stripping action.

Figure 1A:
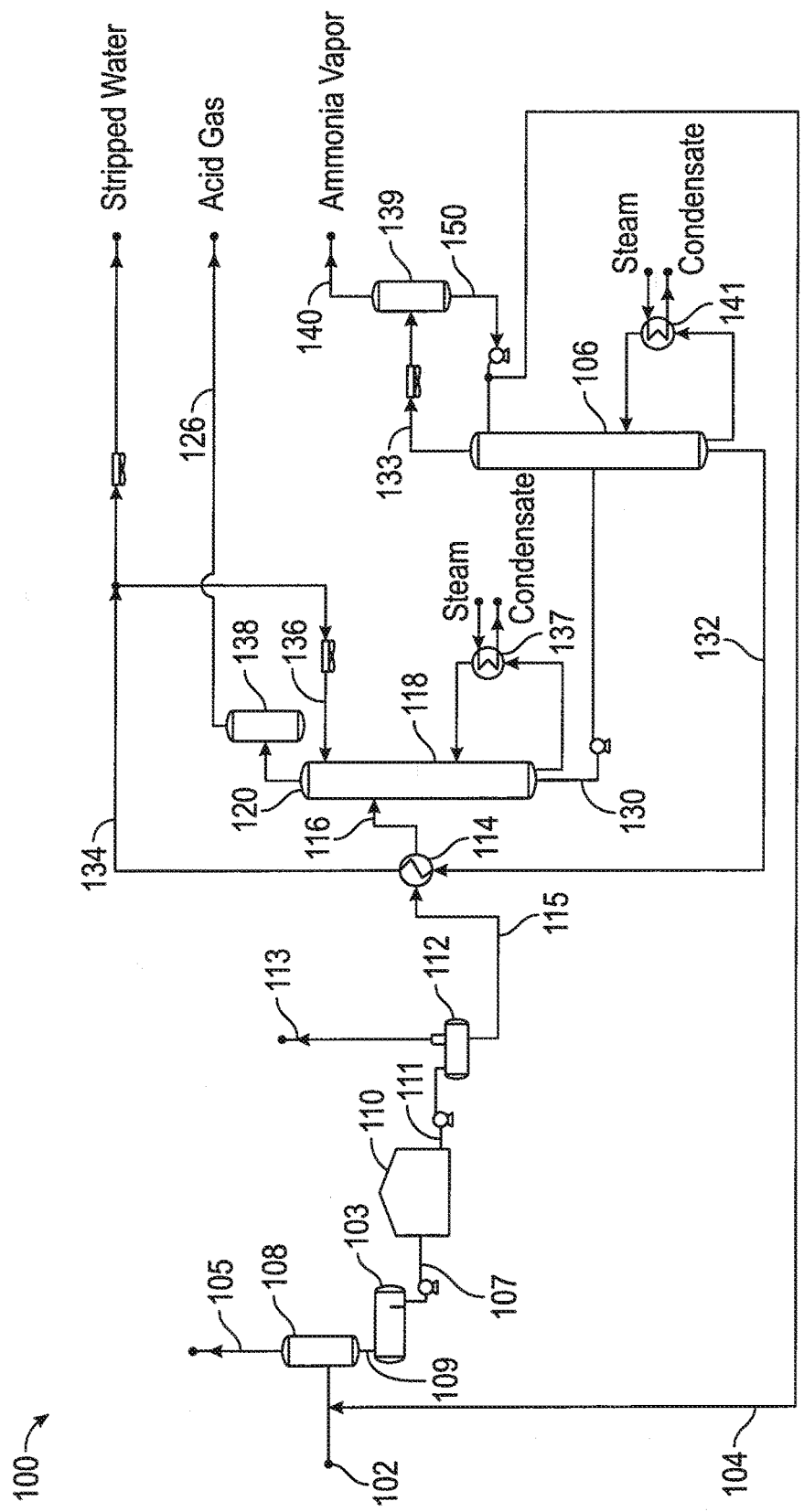
FIGS. 1A-1B are schematic diagrams illustrating a conventional two-column sour water stripping system.
Figure 1B:
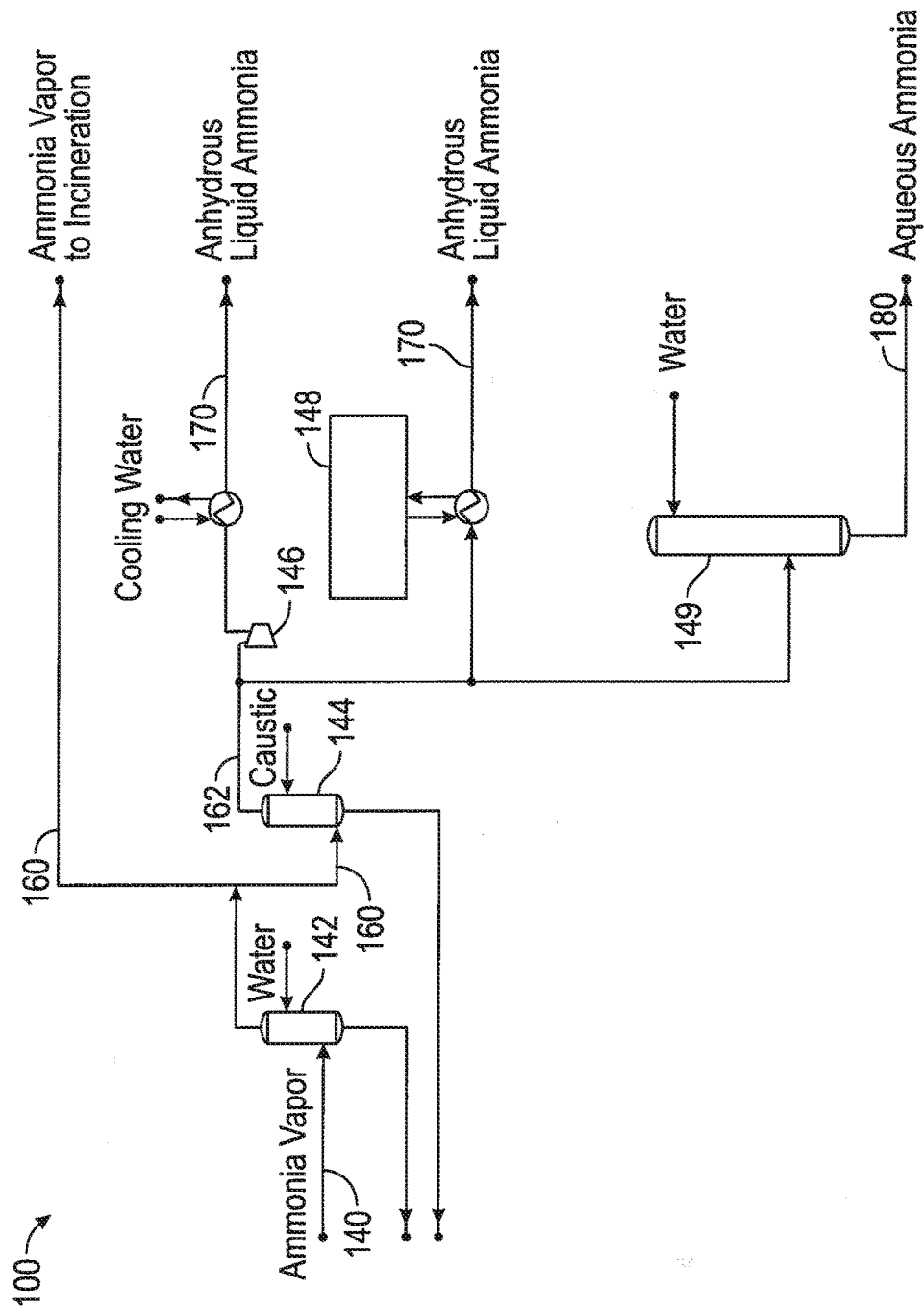
Figure 2:
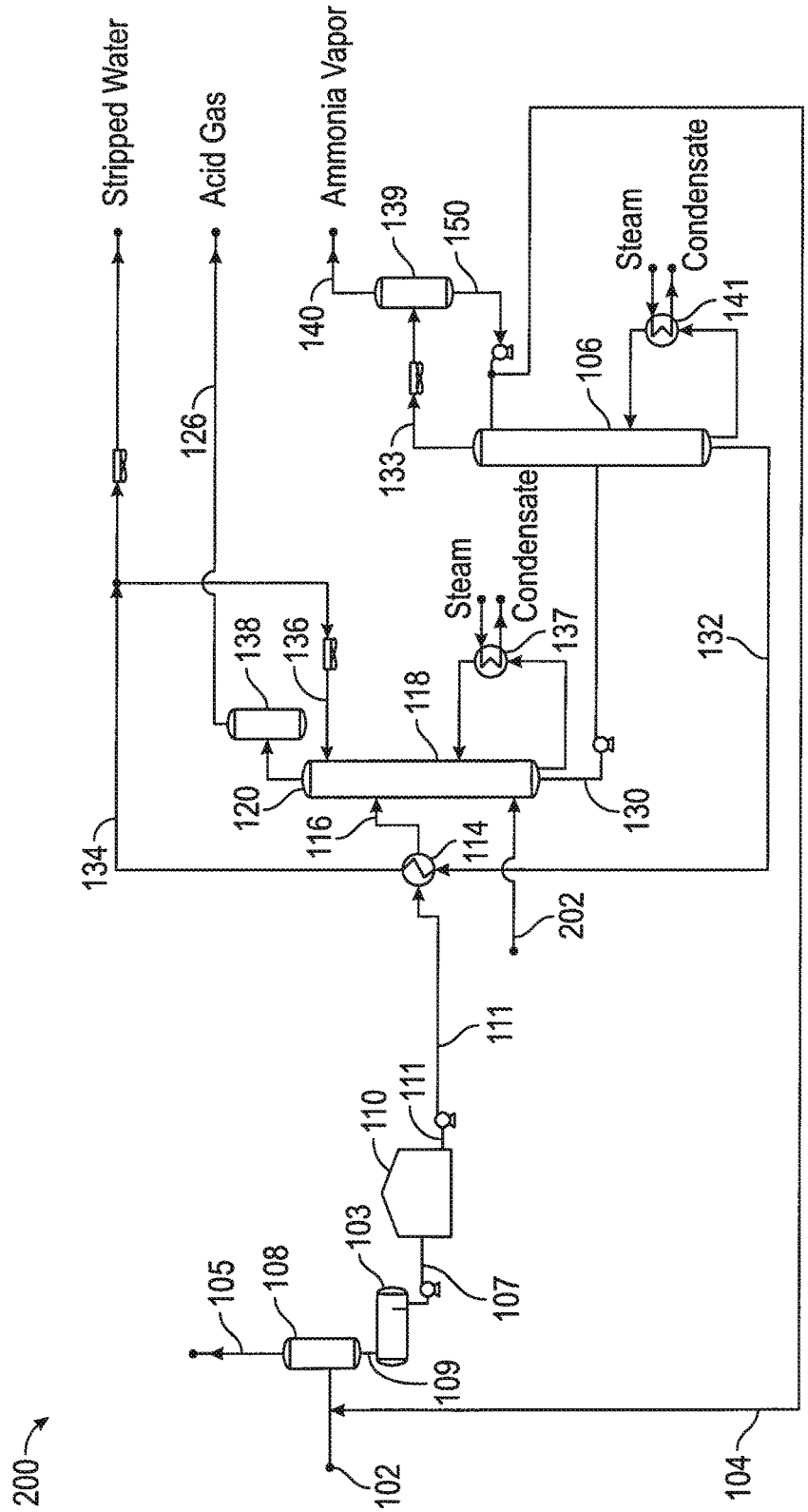
FIG. 2 is a schematic diagram illustrating the H2S stripping stage in FIG. 1A according to the present invention.

Referring now to FIG. 2, a schematic diagram illustrates the H2S stripping stage in FIG. 1A for a modified system 200 that uses a stripping gas stream 202 to enhance the separation of H2S and NH3 in the H2S stripper 118. This stage can consist of various pieces of equipment depending upon the ultimate concentration and quality of NH3 desired. The stripping gas stream 202 may be introduced anywhere between the top and bottom of the H2S stripper 118. Preferably, however, the stripping gas stream 202 is introduced near the bottom of the H2S stripper 118 because it will contact more of the heated deoiled sour water stream 116. In this manner, any conventional two-column sour water stripping system that includes a H2S stripping stage may be easily retrofitted with the introduction of a stripping gas.

The stripping gas stream 202 may include carbon dioxide and/or any inert gas, which is a gas that does not react with other constituents of the H2S stripper 118 or sour water stripper such as, for example, Hydrogen, Helium, Boron, Neon, Argon, Krypton, Xenon, Radon, diatomic nitrogen, methane, and ethane.

In the operation of a two-column sour water stripping system with an H2S stripping stage that includes a stripping gas stream 202 comprising carbon dioxide, the separation of the H2S and NH3 may be improved by at least five percent. By enhancing the separation of H2S and NH3 in this manner, the consumption of utilities (e.g. reboiler heating media) in the two-column sour water stripping system will be lowered resulting in energy savings or performance may be improved with the same utility consumption.

Conventional two-column sour water stripping systems have been around since the 1960's. While operators of such systems have recognized the need for enhanced separation of H2S and NH3, the characteristics of carbon dioxide are similar to those of an acid gas. This explains why the need for enhanced separation of H2S and NH3 using carbon dioxide in the H2S stripping stage of a two-column sour water stripping system, with another acid gas (H2S), has been unresolved since the 1960's.

The invention claimed is:

1. A method for separating hydrogen sulfide from ammonia, which comprises:
   introducing a fluid mixture of the hydrogen sulfide and the ammonia into a hydrogen sulfide stripper;
   introducing a stripping gas into the hydrogen sulfide stripper, wherein the stripping gas comprises only carbon dioxide and an inert gas selected from the group consisting of Helium, Neon, Argon, Krypton, Xenon and Radon; and
   separating most of the hydrogen sulfide from the ammonia in the fluid mixture using the stripping gas in the hydrogen sulfide stripper, which forms a hydrogen sulfide stripper overheads stream and a hydrogen sulfide stripper bottoms stream.

2. The method of claim 1, wherein the hydrogen sulfide stripper overheads stream comprises the most hydrogen sulfide from the fluid mixture and the hydrogen sulfide stripper bottoms stream comprises the most ammonia from the fluid mixture.

3. The method of claim 1, wherein the stripping gas separates most of the hydrogen sulfide from the ammonia in the fluid mixture by lowering a partial pressure of the hydrogen sulfide in the hydrogen sulfide stripper and providing a stripping action.

4. The method of claim 1, wherein the stripping gas stream comprises equal amounts of the carbon dioxide and the inert gas.

5. The method of claim 1, wherein the stripping gas stream comprises more of the carbon dioxide than the inert gas.

6. The method of claim 1, wherein the stripping gas stream comprises more of the inert gas than the carbon dioxide.

* * * * *